United States Patent
Chen

(10) Patent No.: US 7,131,696 B1
(45) Date of Patent: Nov. 7, 2006

(54) SEAT DEVICE FOR A VEHICLE

(75) Inventor: Min-Chang Chen, Taichung Hsien (TW)

(73) Assignee: Giant Manufacturing Co., Ltd., Taichung Hsien (TW)

( * ) Notice: Subject to any disclaimer, the term of this patent is extended or adjusted under 35 U.S.C. 154(b) by 0 days.

(21) Appl. No.: 11/183,772

(22) Filed: Jul. 19, 2005

(51) Int. Cl.
*B60N 2/02* (2006.01)

(52) U.S. Cl. .................................. 297/336; 297/344.18

(58) Field of Classification Search ................ 297/326, 297/335, 331, 344.18, 14, 15, 328, 314, 332, 297/333, 334, 336, 378.1; 296/65.01, 65.05; 248/371, 188.5, 188.6, 219.2
See application file for complete search history.

(56) References Cited

U.S. PATENT DOCUMENTS

| | | | | |
|---|---|---|---|---|
| 1,348,569 A | * | 8/1920 | Knights | 248/371 |
| 2,319,700 A | * | 5/1943 | Miller et al. | 297/328 |
| 2,759,528 A | * | 8/1956 | Rachman et al. | 108/5 |
| 2,797,732 A | * | 7/1957 | Thomas | 248/398 |
| 3,522,970 A | * | 8/1970 | Francis | 297/335 |
| 3,770,236 A | * | 11/1973 | Marsh et al. | 248/408 |
| 3,873,054 A | * | 3/1975 | McKee et al. | 248/371 |
| 3,933,330 A | * | 1/1976 | Gwin | 248/371 |
| 3,975,050 A | * | 8/1976 | McKee | 297/328 |
| 4,076,302 A | * | 2/1978 | Sable | 296/65.06 |
| 4,448,454 A | * | 5/1984 | Scott | 297/313 |
| 5,746,152 A | * | 5/1998 | Huse | 114/363 |

* cited by examiner

*Primary Examiner*—Milton Nelson, Jr.
(74) *Attorney, Agent, or Firm*—Harness, Dickey & Pierce, P.L.C.

(57) ABSTRACT

A seat device includes: a seat-supporting post unit; a lower bracket secured to the seat-supporting post unit; a seat unit including an upper bracket that is pivoted to the lower bracket; first and second engaging members formed on the lower bracket; and a third engaging member movable between an engaging position and a releasing position. The third engaging member engages the first engaging member when the seat unit is disposed at the non-folded position and when the third engaging member is disposed at the engaging position. The third engaging member engages releasably the second engaging member when the seat unit is disposed at the folded position and when the third engaging member is disposed at the engaging position.

10 Claims, 6 Drawing Sheets

SEAT DEVICE FOR A VEHICLE

BACKGROUND OF THE INVENTION

1. Field of the Invention

The invention relates to a seat device, and more particularly to a seat device for a vehicle.

2. Description of the Related Art

As shown in FIG. 1, a conventional vehicle includes a front chassis part 1 and a rear chassis part 2. The front chassis part 1 has a rear end formed with a first toothed portion 101, and a through-hole 102 formed in the first toothed portion 101. The rear chassis part 2 has a front end formed with a second toothed portion 201, and a tumbler pin 202 mounted movably on the second toothed portion 201. When the front and rear chassis parts 1, 2 are coupled together, the first toothed portion 101 meshes with the second toothed portion 201, and the tumbler pin 202 engages the through-hole 102 so as to interlock the front and rear chassis parts 1,2. A seat unit (not shown) is mounted detachably on the rear chassis part 2 through a post that is inserted into a stand (not shown) on the rear chassis part 2.

The conventional vehicle is disadvantageous in that, since the size of the seat unit is relatively large and the weight of the seat unit is relatively heavy, detachment of the seat unit from the stand on the rear chassis part 2 is relatively inconvenient.

SUMMARY OF THE INVENTION

Therefore, the object of the present invention is to provide a seat device that can overcome the aforesaid drawback associated with the related art.

According to the present invention, there is provided a seat device for a vehicle. The seat device includes: a seat-supporting post unit adapted to be mounted on and standing upright from a chassis of a vehicle; a lower bracket secured to the seat-supporting post unit; a seat unit including an upper bracket that is pivoted to the lower bracket so as to permit rotation of the seat unit relative to the seat-supporting post unit between folded and non-folded positions, and a seating member that is secured to the upper bracket; a first interlocking unit having first and second engaging members that are formed on the lower bracket; and a second interlocking unit mounted on the upper bracket and including a third engaging member that is movable relative to the upper and lower brackets between an engaging position and a releasing position. The third engaging member engages releasably the first engaging member when the seat unit is disposed at the non-folded position and when the third engaging member is disposed at the engaging position. The third engaging member engages releasably the second engaging member when the seat unit is disposed at the folded position and when the third engaging member is disposed at the engaging position. The third engaging member is disengaged from the first and second engaging members when the third engaging member is disposed at the releasing position.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF EXEMPLARY EMBODIMENTS

Figure 1:
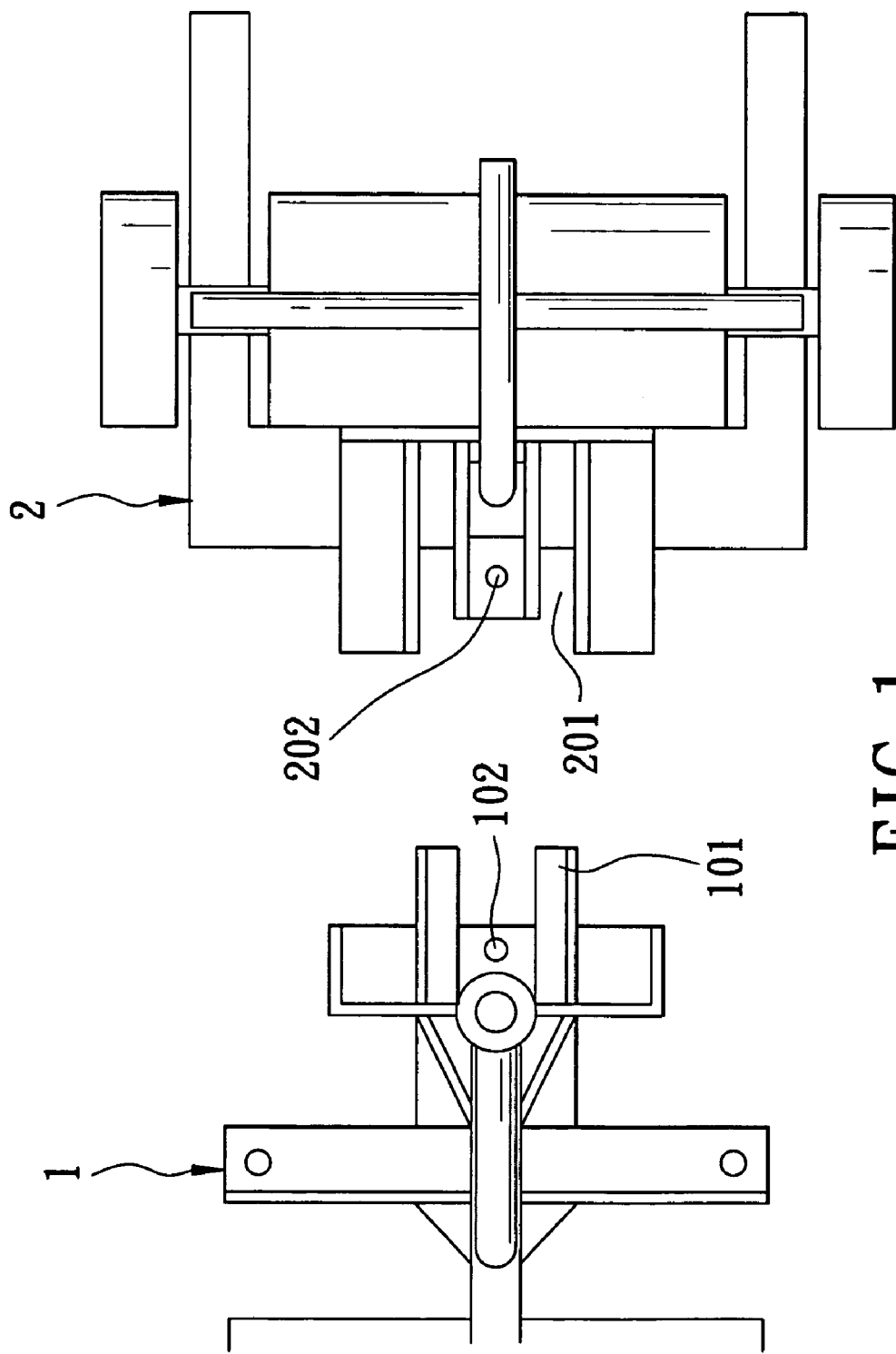
FIG. 1 is a schematic view of selected portions of a conventional vehicle.
Figure 2:
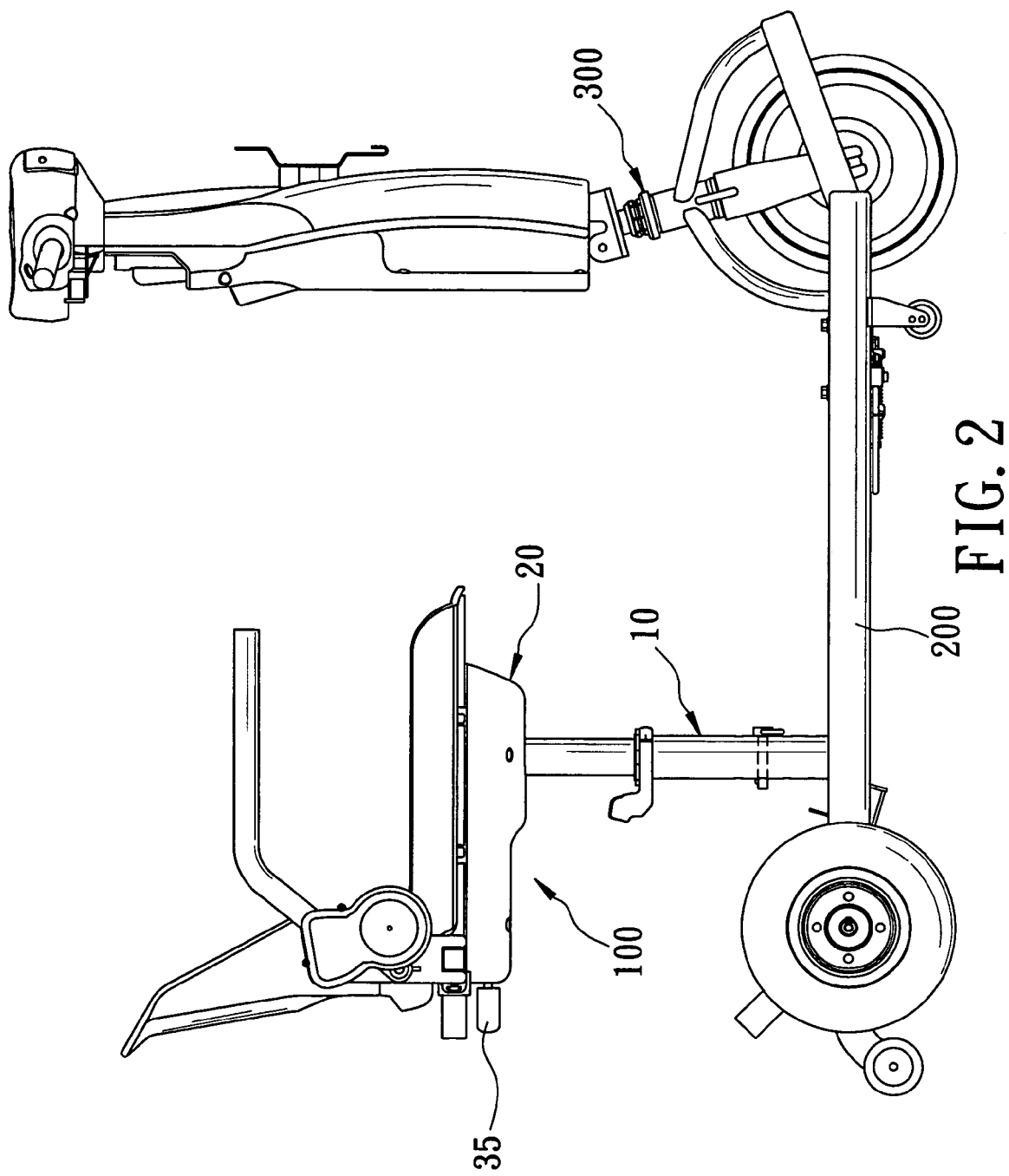
FIG. 2 is a schematic side view of a vehicle that incorporates an exemplary embodiment of a seat device according to the present invention.
Figure 3:
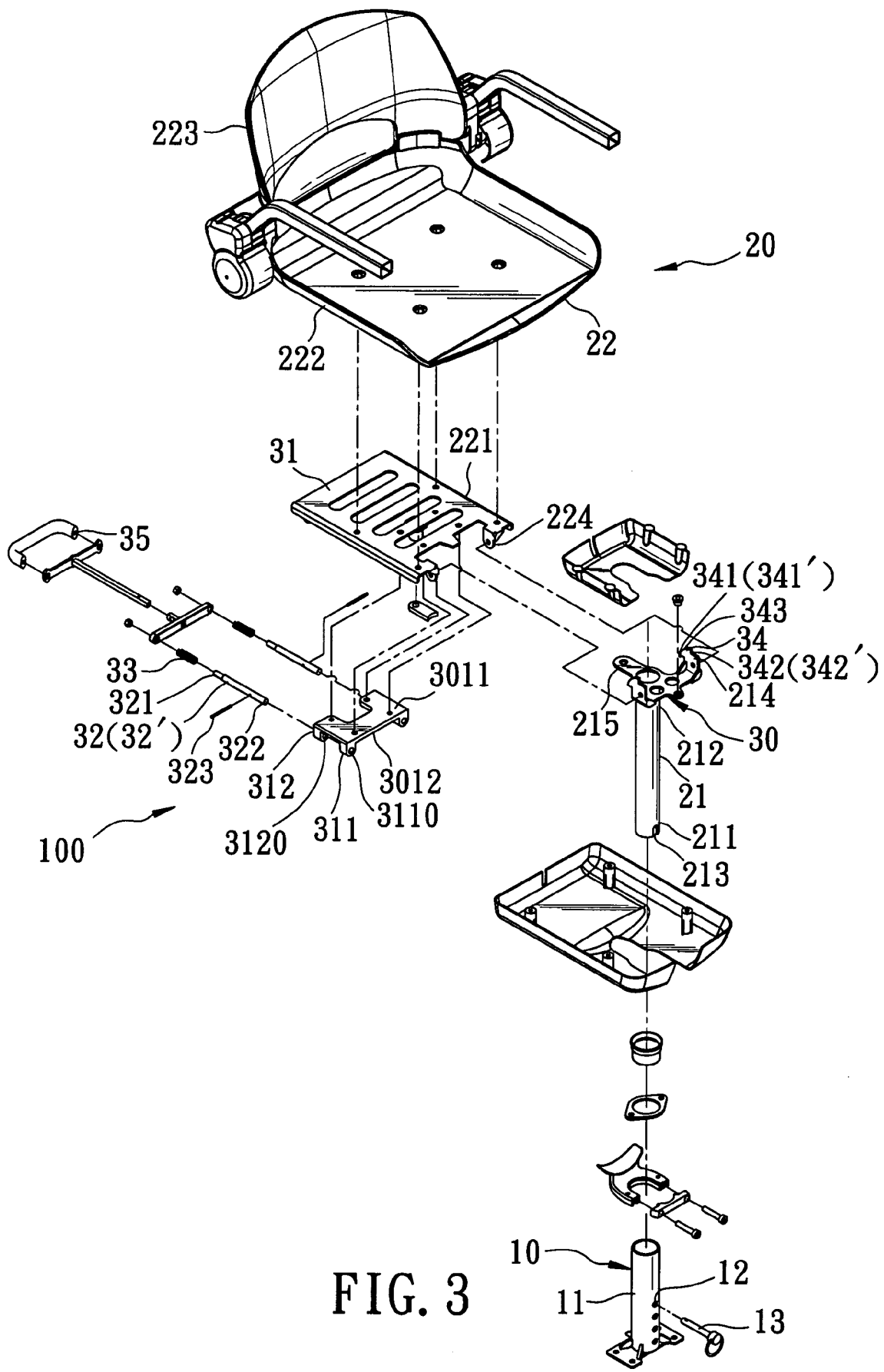
FIG. 3 is an exploded perspective view of an exemplary embodiment.

Referring to FIGS. 2 and 3, an exemplary embodiment of a seat device 100 according to the present invention is shown to be adapted to be mounted on a chassis 200 of a vehicle. Front and rear wheels are connected to the chassis 200. The vehicle further includes a head tube unit 300. The seat device 100 includes a seat-supporting post unit 10, a lower bracket 30, a seat unit 20, a first interlocking unit formed with a pair of first engaging members 341 and a pair of second engaging members 342, and a second interlocking unit including a pair of third engaging members 32, each of which is engageable with a selected one of an adjacent one of the first engaging members 341 and an adjacent one of the second engaging members 342.

The seat-supporting post unit 10 is mounted on and stands upright from the chassis 200. The post unit 10 includes a hollow lower post 11 that is mounted on the chassis 200, an upper post 21 that is removably inserted into the lower post 11, and a positioning pin 13 that extends through the lower post 11. The lower post 11 of the seat-supporting post unit 10 is formed with at least two pin holes 12 aligned with each other along the length of the lower post 11. The positioning pin 13 extends into a selected one of the pin holes 12 such that the upper post 21 is allowed to be seated on the positioning pin 13. The upper post 21 has a bottom end 211 and an upper end 212 opposite to the bottom end 211. The bottom end 211 is formed with a notch 213 for extension of the positioning pin 13 therethrough.

The lower bracket 30 includes a main plate 215 secured to the upper end 212 of the upper post 21 of the seat-supporting post unit 10, and a pair of pivot lugs 214 spaced apart from each other and extending transversely from the main plate 215.

The first interlocking unit includes a pair of sector-shaped plates 34, each of which extends from a respective one of the pivot lugs 214 and each of which defines L-shaped first and second steps 341', 342' which respectively define the corresponding first and second engaging members 341, 342. The L-shaped first and second steps 341', 342' of each of the sector-shaped plates 34 form an angle of 90 degrees. Each of the sector-shaped plates 34 has a curved guiding face 343 that extends between the corresponding first and second engaging members 341, 342.

The seat unit 20 includes an upper bracket 31 that has a bottom side 221 formed with a pair of pivot tabs 224 connected pivotably and respectively to the pivot lugs 214 so as to permit rotation of the seat unit 20 relative to the seat-supporting post unit 10 between folded and non-folded positions. The seat unit 20 further includes a seating member 22 that has a seat plate 222 secured to the upper bracket 31, and a backrest plate 223 connected to seat plate 222.

The second interlocking unit is mounted on the upper bracket 31, and further includes a sliding seat 301, a pair of biasing members 33, a pair of abutting pins 323, and a lever 35.

The sliding seat 301 has a top side 3011 secured to the upper bracket 31, and a bottom side 3012 opposite to the top side 3011. The bottom side 3012 has two lateral sides, each of which is formed with a first protrusion 311 that is aligned with a respective one of the pivot tabs 224 and that is formed with a first guiding hole 3110, and a second protrusion 312 that is spaced apart from and that is aligned with the first protrusion 311 and that is formed with a second guiding hole 3120.

Each of the third engaging members 32 is movable relative to the upper and lower brackets 31, 30 between an engaging position and a releasing position such that each third engaging member 32 engages releasably the respective first engaging member 341 (see FIG. 4) when the seat unit 20 is disposed at the non-folded position and when the third engaging member 32 is disposed at the engaging position, that each third engaging member 32 engages releasably the respective second engaging member 342 (see FIG. 6) when the seat unit 20 is disposed at the folded position and when the third engaging member 32 is disposed at the engaging position, and that the third engaging members 32 are disengaged from the first and second engaging members 341, 342 (see FIG. 5) when the third engaging members 32 are disposed at the releasing position. The upper and lower brackets 31, 30 are substantially parallel to each other when the seat unit 20 is disposed at the non-folded position, and are substantially perpendicular to each other when the seat unit 20 is disposed at the folded position.

In this embodiment, each of the third engaging members 32 includes a locking rod 32' that has an engaging end 322 and an operating end 321 opposite to the engaging end 322, and that extends through the first and second guiding holes 3110, 3120.

Each of the biasing members 33 restores a corresponding one of the third engaging members 32 from the releasing position to the engaging position.

Each of the abutting pins 323 is secured to a corresponding one of the locking rods 32' of the third engaging members 32, and is disposed between the first and second guiding holes 3110, 3120. Each of the biasing members 33 is sleeved on the respective locking rod 32', and abuts against the respective abutting pin 323.

The lever 35 connects the operating ends 321 of the locking rods 32' of the third engaging members 32, and is operable for pulling the third engaging members 32 from the engaging position to the releasing position.

Figure 4:
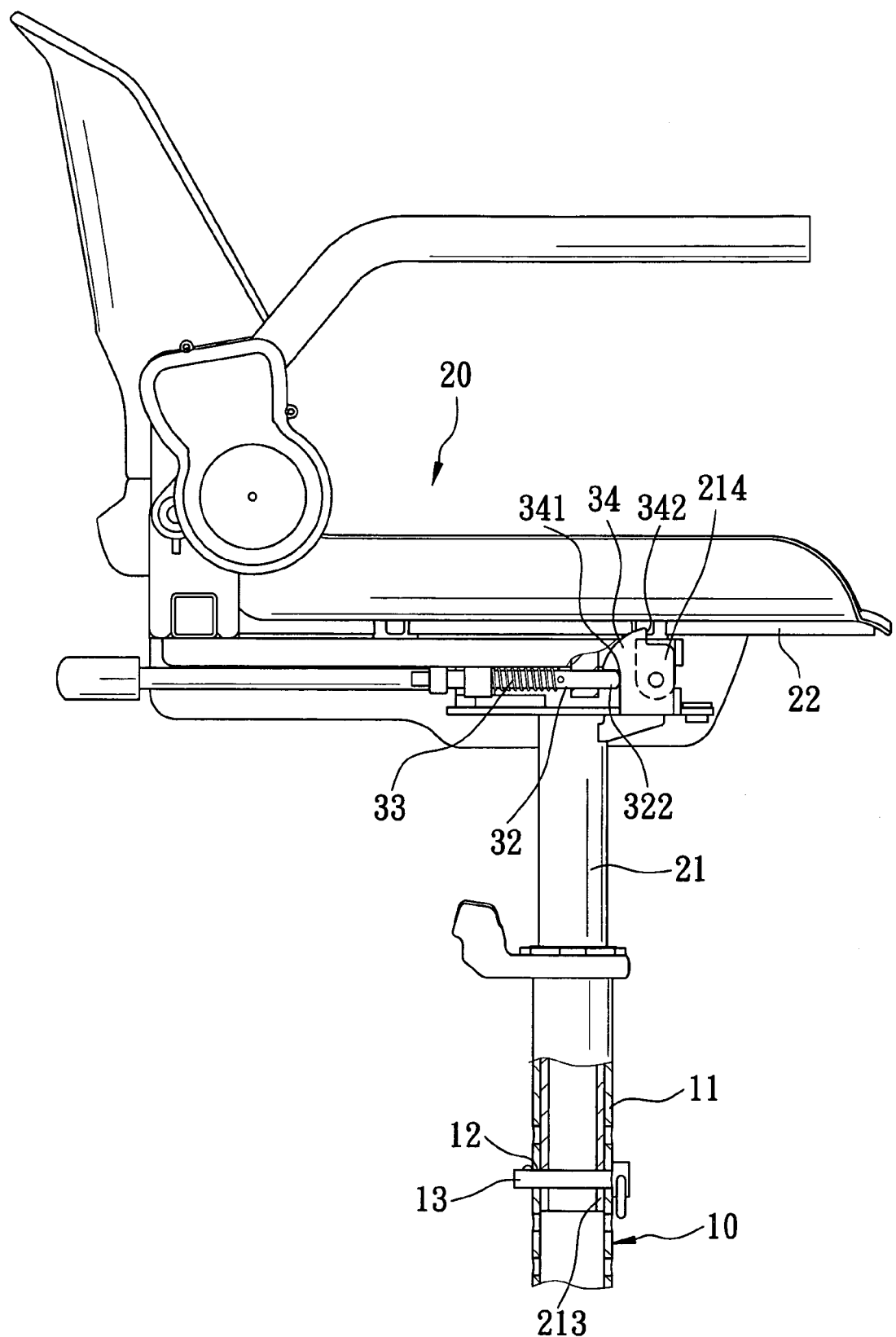
FIG. 4 is an assembled partially cutaway view of an exemplary embodiment for illustrating how a third engaging member might engage a first engaging member to position a seat unit at an unfolded position.

When the seat unit 20 is disposed at the non-folded position, as shown in FIG. 4, the third engaging members 32 are pushed to move to the engaging position by virtue of a biasing force of the biasing members 33, thereby rendering the engaging ends 322 to abut respectively against the L-shaped first steps 341' of the first engaging members 341 so as to prevent rotation of the seat unit 20 in a first rotating direction, and so as to retain the seat unit 20 at the non-folded position.

Figure 5:
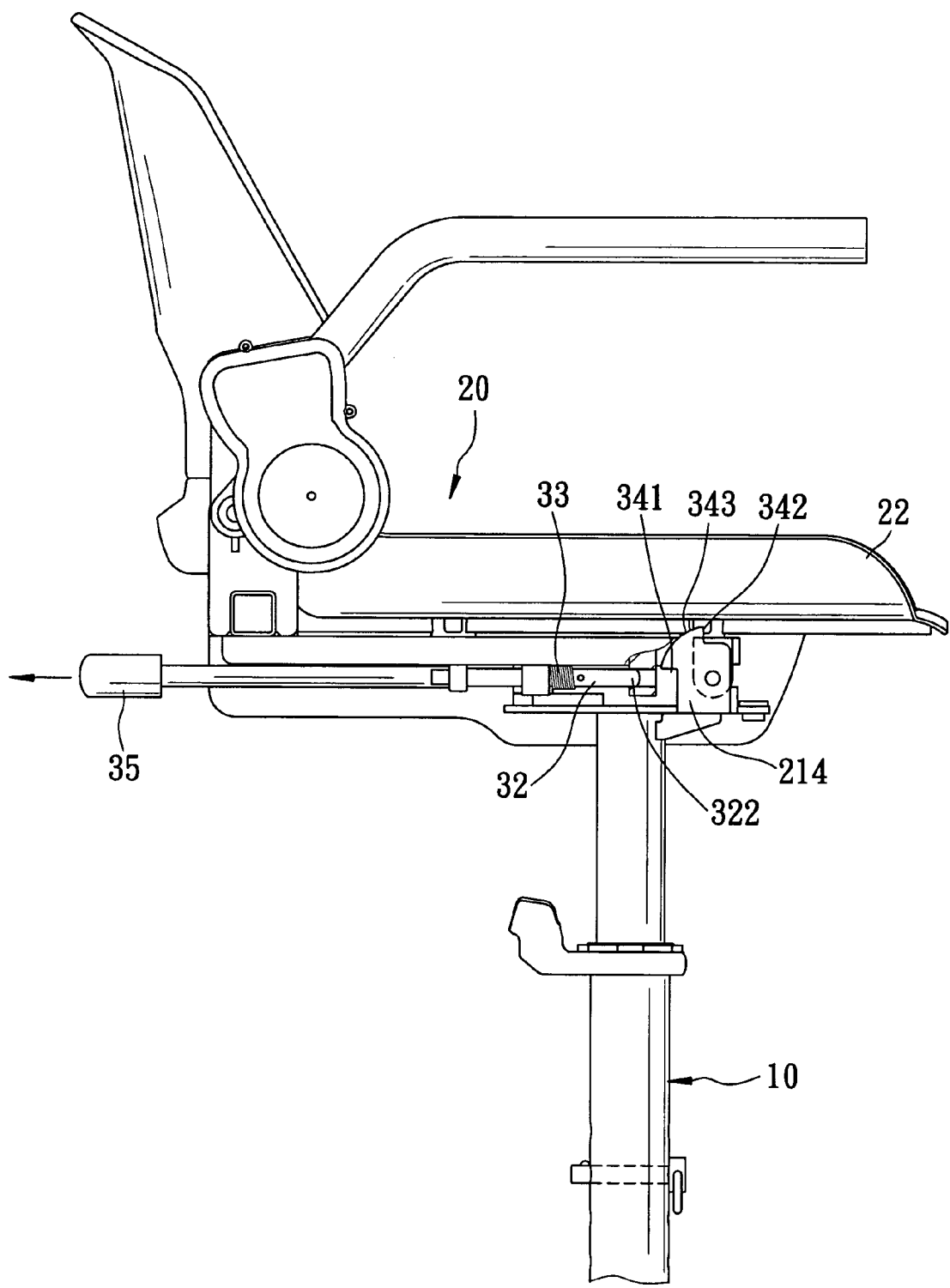
FIG. 5 is an assembled partially cutaway view of an exemplary embodiment for illustrating how a third engaging member might disengage from the first engaging member using a lever.
Figure 6:
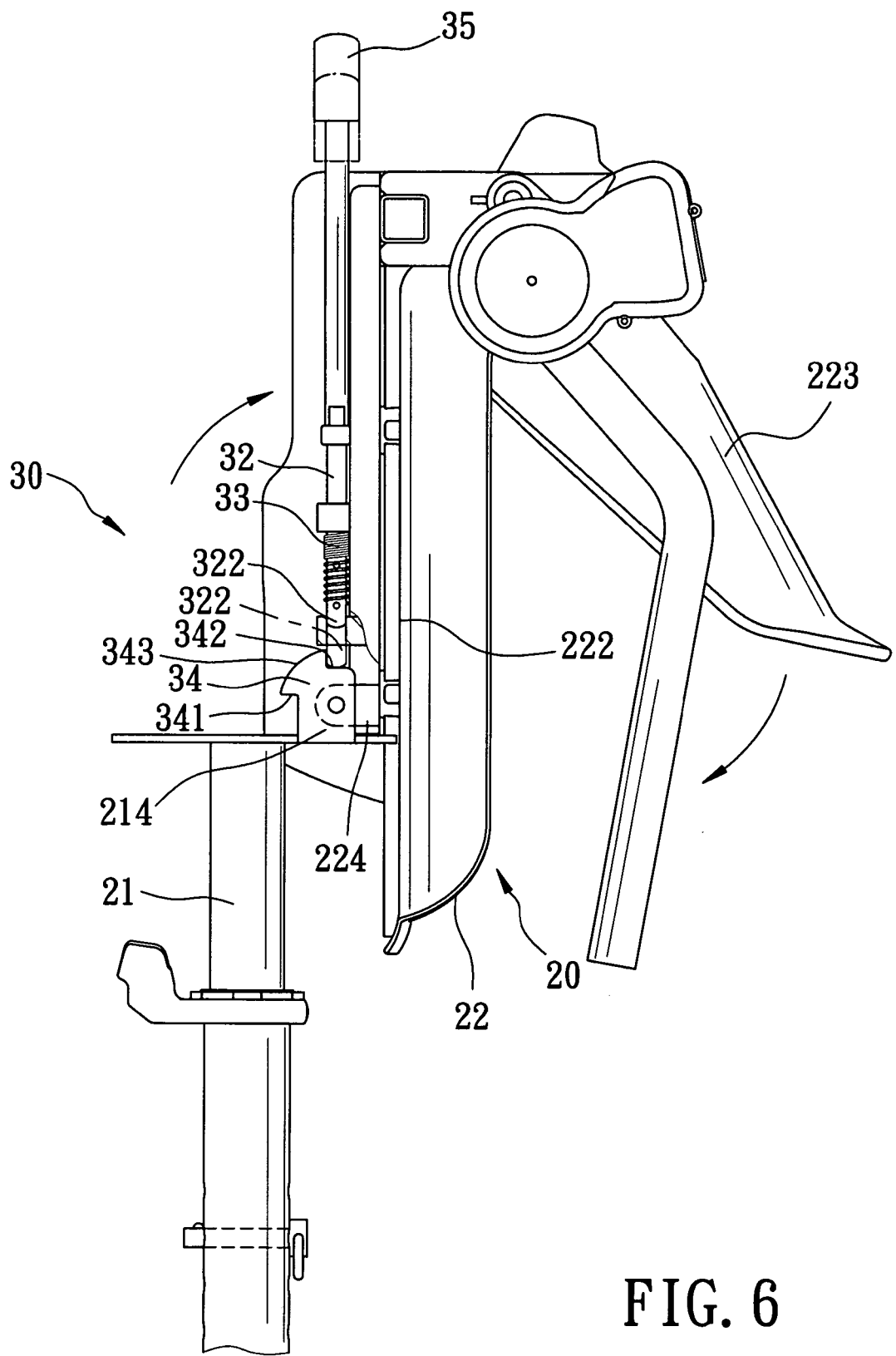
FIG. 6 is an assembled partially cutaway view of an exemplary embodiment for illustrating how a third engaging member might engage a second engaging member to position the seat unit at a folded position.

When the seat unit 20 is to be moved from the non-folded position to the folded position, as shown in FIG. 5, the lever 35 is pulled against the biasing force of the biasing members 33 so as to pull the third engaging members 32 from the engaging position to the releasing position (at the same time, the biasing members 33 store a biasing force to restore the third engaging members 32 from the releasing position to the engaging position), thereby permitting rotation of the seat unit 20 in the first rotating direction. When the seat unit 20 is rotated about 90 degrees to the folded position, the backrest plate 223 can then be folded as shown in FIG. 6. During the pulling operation of the lever 35, the locking rods 32' of the third engaging members 32 are guided by the first and second guiding holes 3110, 3120. The engaging ends 322 of the locking rods 32' are respectively slid over the curved guiding faces 343 of the sector-shaped plates 34 during movement of the engaging ends 322 of the locking rods 32' from the L-shaped first steps 341' to the L-shaped second steps 342'. The locking rods 32' of the third engaging members 32 are moved to the engaging position by the urging action of the biasing members 33, thereby rendering the engaging ends 322 to abut against the respective L-shaped second steps 342 of the second engaging members 342' so as to prevent rotation of the seat unit 20 in a second rotating direction opposite to the first rotating direction and so as to retain the seat unit 20 at the folded position.

When the seat unit 20 is disposed at the folded position, the user can easily lift the seat unit 20 and remove it from the seat-supporting post unit 10 for transport or storage.

With the inclusion of the first and second interlocking units in the seat device 100 of the present invention, the seat unit 20 can be retained at the folded position so as to facilitate removal of the seat unit 20 from the seat-supporting post unit 10.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A seat device for a vehicle, said seat device comprising:
    a seat-supporting post unit adapted to be mounted on and standing upright from a chassis of the vehicle;
    a lower bracket secured to said seat-supporting post unit;
    a seat unit including an upper bracket that is pivoted to said lower bracket so as to permit rotation of said seat unit relative to said seat-supporting post unit between folded and non-folded positions, and a seating member that is secured to said upper bracket;
    a first interlocking unit having first and second engaging members that are formed on said lower bracket; and
    a second interlocking unit mounted on said upper bracket and including a third engaging member that is movable in a substantially linear path relative to said upper and lower brackets for engaging releasably said first engaging member when said seat unit is disposed at said non-folded position, thereby retaining said seat unit at said non-folded position, and for engaging releasably said second engaging member when said seat unit is disposed at said folded position, thereby retaining said seat unit at said folded position.

2. The seat device as claimed in claim 1, wherein said first interlocking unit includes a sector-shaped plate that is formed on said lower bracket and that is formed with L-shaped first and second steps which respectively define said first and second engaging members, said third engaging member including a locking rod that abuts against said L-shaped first step when said seat unit is disposed at said non-folded position and when said third engaging member is disposed at an engaging position, thereby preventing rotation of said seat unit in a first rotating direction, and that abuts against said L-shaped second step when said seat unit is disposed at said folded position and when said third engaging member is disposed at another engaging position, thereby preventing rotation of said seat unit in a second rotating direction opposite to said first rotating direction.

3. The seat device as claimed in claim 2, wherein said L-shaped first and second steps of said sector-shaped plate form an angle of 90 degrees.

4. The seat device as claimed in claim 2, wherein said upper and lower brackets are substantially parallel to each other when said seat unit is disposed at said non-folded position, and are substantially perpendicular to each other when said seat unit is disposed at said folded position.

5. The seat device as claimed in claim 2, wherein said lower bracket includes a main plate secured to said seat-supporting post unit, and a pivot lug extending transversely from said main plate, said sector-shaped plate extending from said pivot lug to define said L-shaped first and second steps, said upper bracket having a bottom side formed with a pivot tab pivotably connected to said pivot lug.

6. The seat device as claimed in claim 2, wherein said seat-supporting post unit includes a hollow lower post that is adapted to be mounted on the vehicle chassis, an upper post that is removably inserted into said lower post, and a positioning pin that extends through said lower post, said upper post being seated on said positioning pin.

7. The seat device as claimed in claim 6, wherein said lower post of said seat-supporting post unit is formed with at least two pin holes aligned with each other along the length of said lower post, said positioning pin extending into a selected one of said pin holes.

8. The seat device as claimed in claim 2, wherein said second interlocking unit further includes a sliding seat that is secured to said upper bracket and that is formed with two guiding holes for extension of said locking rod of said third engaging member therethrough so as to guide movement of said locking rod.

9. The seat device as claimed in claim 8, wherein said second interlocking unit further includes a biasing member for restoring said third engaging member from a releasing position to said engaging position when said seat unit is disposed at said non-folded position, and for restoring said third engaging member from another releasing position to said another engaging position when said seat unit is disposed at said folded position.

10. The seat device as claimed in claim 9, wherein said second interlocking unit further includes an abutting pin that is disposed between said guiding holes and that is secured to said locking rod, said biasing member being sleeved on said locking rod and abutting against said abutting pin.

* * * * *